(12) United States Patent
Antrack et al.

(10) Patent No.: US 12,438,169 B2
(45) Date of Patent: Oct. 7, 2025

(54) DIAGNOSTIC SYSTEM FOR CONDITION-BASED MAINTENANCE OF FUEL CELL FILTERS

(71) Applicant: Siemens Mobility GmbH, Munich (DE)

(72) Inventors: Markus Antrack, Riesa (DE); De-Niang Maria Peymandar, Moenchengladbach (DE)

(73) Assignee: Siemens Mobility GmbH, Munich (DE)

( * ) Notice: Subject to any disclaimer, the term of this patent is extended or adjusted under 35 U.S.C. 154(b) by 975 days.

(21) Appl. No.: 17/606,495

(22) PCT Filed: Apr. 23, 2020

(86) PCT No.: PCT/EP2020/061325
§ 371 (c)(1),
(2) Date: Oct. 26, 2021

(87) PCT Pub. No.: WO2020/216838
PCT Pub. Date: Oct. 29, 2020

(65) Prior Publication Data
US 2022/0209264 A1     Jun. 30, 2022

(30) Foreign Application Priority Data
Apr. 26, 2019   (DE) ............... 10 2019 206 009.9

(51) Int. Cl.
*H01M 8/0668*    (2016.01)
*B60H 1/00*     (2006.01)
(Continued)

(52) U.S. Cl.
CPC .... *H01M 8/04686* (2013.01); *B60H 1/00278* (2013.01); *B60H 1/00564* (2013.01);
(Continued)

(58) Field of Classification Search
CPC ..................... H01M 8/0687; B01D 46/0086
See application file for complete search history.

(56) References Cited

U.S. PATENT DOCUMENTS 4,634,514 A *  1/1987  Nishizawa ........... G01N 27/417
                                              204/406
7,449,046 B2   11/2008  Schroeter
(Continued)

FOREIGN PATENT DOCUMENTS

DE         254649 A1    3/1988
DE       10230283 A1    1/2004
(Continued)

*Primary Examiner* — Allen R. B. Schult
(74) *Attorney, Agent, or Firm* — Laurence A. Greenberg; Werner H. Stemer; Ralph E. Locher

(57) ABSTRACT

A diagnostic system for a filter of a fuel cell includes a supply air duct in which a filter is disposed and in which a supply air flow toward the fuel cell can be guided. A diagnostic arrangement is disposed in the supply air duct after the filter in the flow direction of the supply air. The diagnostic arrangement permits the determination of a loading of the filter with at least one predefined substance. A vehicle having the system and a method for diagnosis of at least one filter of a fuel cell, are also provided.

15 Claims, 1 Drawing Sheet

(51) Int. Cl.
  *H01M 8/04664*  (2016.01)
  *H01M 8/0662*  (2016.01)
  *H01M 8/10*  (2016.01)

(52) U.S. Cl.
  CPC ....... *H01M 8/0668* (2013.01); *H01M 8/0675* (2013.01); *H01M 8/0687* (2013.01); *H01M 2008/1095* (2013.01); *H01M 2250/20* (2013.01)

(56) References Cited

U.S. PATENT DOCUMENTS

| | | |
|---|---|---|
| 8,882,874 B1 | 11/2014 | Cross |
| 2016/0068077 A1* | 3/2016 | Smith ............... H01M 8/04089 429/410 |
| 2016/0161457 A1 | 6/2016 | Jung et al. |
| 2016/0308226 A1 | 10/2016 | Behrendt et al. |

FOREIGN PATENT DOCUMENTS

| | | |
|---|---|---|
| DE | 202004017891 U1 | 2/2005 |
| DE | 102005057628 A1 | 6/2007 |
| DE | 202013005806 U1 | 8/2013 |
| DE | 202013007337 U1 | 9/2013 |
| DE | 102015206633 A1 | 10/2016 |
| DE | 102012016041 B4 | 1/2017 |
| EP | 2256092 B1 | 12/2015 |
| JP | H09155132 A | 6/1997 |
| JP | 2009080962 A * | 4/2009 |

\* cited by examiner

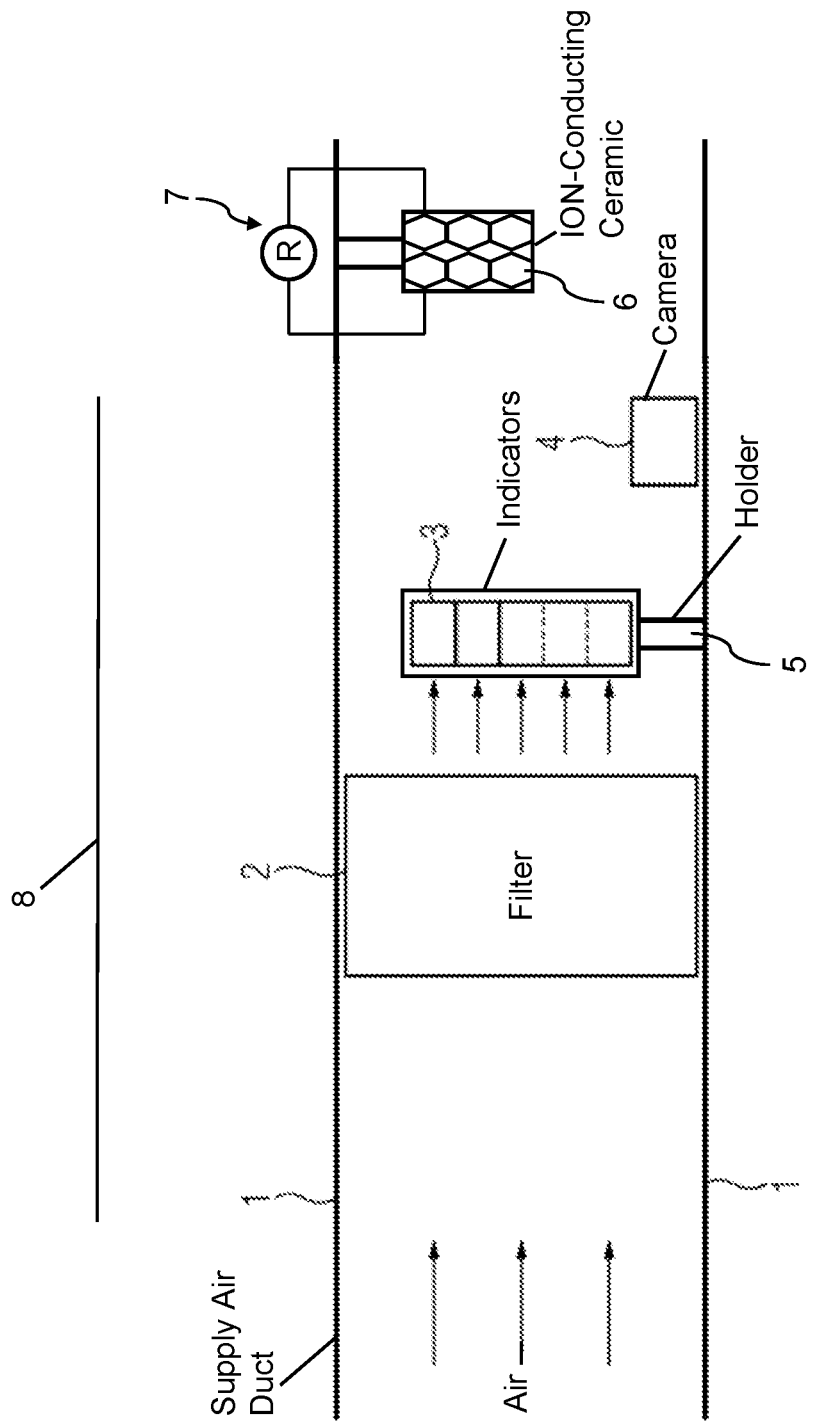

DIAGNOSTIC SYSTEM FOR CONDITION-BASED MAINTENANCE OF FUEL CELL FILTERS

FIELD AND BACKGROUND OF THE INVENTION

The invention relates to a diagnostic system for a filter in the supply line flow of a fuel cell and a method for diagnosis of a filter of a fuel cell.

Fuel cells, in particular what are known as PEM fuel cells (proton exchange membrane fuel cells, PEMFC), react in a sensitive manner to salts, nitrogen oxides or composite substances with sulfur or ammonia, which enter the process via the supply air. For the efficient use of mobile fuel cells, filters are therefore used. Effective filtration is essential in order to protect the sensitive structural elements of the fuel cell and to ensure a longer service life. These filters protect the catalyst material and the membranes used in the stack and system components from harmful gases and particles on an ongoing basis.

Filters of this kind are known, for example, from DE 102 30 283 A1. The filters have multiple layers, in particular a particle filter for the sorption of particles and dust and a downstream chemical filter for absorbing and binding gaseous and vaporous harmful substances. One version is a filter system with particle filter layers combined with specifically impregnated activated carbon. The filter system thus reduces the amount of harmful gases and particles from the supply air which can enter the fuel cell.

Usual maintenance concepts intend for a regular replacement of the filters after a defined interval. Due to short and fixed replacement intervals of the filters, however, high costs are incurred for the maintenance of the fuel cell.

In order to establish the necessity of regeneration or filter maintenance, DE 102 30 283 A1 now proposes multiple gas or harmful substance sensors behind the filter system, which are set to measure the harmful substances to be separated out and the measurement values thereof are each compared with a limit value, and when this is exceeded a message is generated.

SUMMARY OF THE INVENTION

The object underlying the invention is to reduce the costs of the operation of the fuel cell.

The object is achieved by the features of the independent claims. Developments and embodiments of the invention are to be found again in the features of the dependent claims.

A diagnostic system according to the invention for a filter of a fuel cell is characterized in that the filter is arranged in a supply air duct, in which a supply air flow toward the fuel cell can be guided, and that a diagnostic facility is arranged after the filter in the supply air duct in the flow direction of the supply air, wherein by means of the diagnostic arrangement it is possible to determine a loading of the filter with at least one predefined substance.

According to a first aspect, the diagnostic arrangement comprises at least one indicator for indicating a loading of the indicator with at least one predefined substance.

An indicator is understood to mean a substance for monitoring a chemical state. Indicators indicate a state mostly by way of a particular color, and a change of state by way of a change in color. A substance refers to an element, a compound or a mixture with particular properties. Fluids are flowing substances, in particular gases and liquids, but also plasma, suspensions and aerosols.

The indicator changes its color, for example, due to being loaded with at least one predefined substance, in particular a gas, and thereby indirectly indicates the state of the upstream filter, which for its part is embodied to filter the at least one predefined substance out from the supply line flow of the fuel cell. This is called an indicator reaction. Here, loading means a predefined number of particles of the substance.

If, however, the filter is already at least partially clogged, then it can no longer adequately perform this task and thus particles of the at least one predefined substance can flow through the filter, at least in a sufficient particle count in order to lead to the indicator reaction which they subsequently encounter. A fully functional filter holds back particles of the at least one predefined substance to a sufficient extent, so that, in particular over a predefined period of time, no adequate indicator reaction occurs.

The period of time mentioned relates in particular to the service life of the filter.

According to one development of the first aspect, the at least one indicator is tailored to the filter in such a way that it depicts the loading state of the filter. If the loading of the indicator exceeds a predefined amount, in particular loading with a predefined number of particles of the at least one predefined substance, then an indicator reaction occurs, as described above.

Now, the indicator is tailored to the filter such that the indicator reaction only takes place when the filter function is no longer adequately provided. This is the case, as described above, when the loading of the filter exceeds a critical amount. The indicator reaction therefore indicates the loading of the filter beyond a predefined amount, in particular beyond the loading of the filter with a predefined number of particles of the at least one predefined substance. Filter and indicator are embodied accordingly and are tailored to one another. Therefore, in this case, it is also possible to speak of an indirect establishing of the loading of the filter by way of the indicator, wherein the indicator indicates a filter state.

In this context, the at least one predefined substance is undesirable in the fuel cell. It involves, for example, a substance which is harmful to the fuel cell, such as, for example, carbon monoxide (CO), ammonia ($NH_3$), a nitrogen oxide ($NO_x$), other amides such as urea ($CH_4N_2O$) or a substance from the group of compounds with sulfur, such as, for example, sulfur dioxide ($SO_2$) or hydrogen sulfide ($SH_2$).

The filter or filters upstream of the fuel cell are accordingly suitable for filtering out, and therefore holding back, the substances which are harmful to the fuel cell from the supply line flow.

According to a further development of the first aspect, the at least one indicator is arranged immediately after the filter in the supply line flow toward the fuel cell. An arrangement immediately on the filter would also be conceivable, on the side thereof which faces the fuel cell. Accordingly, the invention may also relate to a filter for use in a diagnostic system according to the invention, wherein the filter comprises at least one indicator, which is arranged on an output side of the filter, in particular is applied directly thereto. In the operationally installed state, the output side of the filter points toward the fuel cell, so that the indicator is arranged downstream of the filter. An input side is accordingly directed counter to the flow in the supply line flow.

The indicator itself may comprise a substrate or another suitable supporting material, to which the material of the indicator is applied.

Advantageously, according to a further development of the first aspect, the diagnostic system has multiple indicators which are different from one another, in order to indicate loadings of the indicators with multiple predefined substances which are different from one another.

A further development of the first aspect provides a holder in the supply air duct of the fuel cell, which is installed there, in particular in a fixed manner, with which the at least one indicator is held in a replaceable manner and therefore is attached in the supply line flow of the fuel cell in a replaceable manner.

Indicator and holder may have interfaces which are correspondingly complementary to one another.

If multiple indicators which are different from one another are provided, then these may be arranged on a common supporting material and held together by means of the holder in the supply line flow of the fuel cell and therefore can be replaced, or they are arranged individually in a chamber system arranged in the supply line flow of the fuel cell, wherein an individual chamber of the chamber system acts as holder for an individual indicator, which then also can be replaced individually and independently of one another.

According to a further development of the first aspect, the diagnostic system comprises at least one optical detector, for example a photosensor, in particular a camera, for optically recording an indicator reaction of the at least one indicator. The optical detector is accordingly oriented toward the at least one indicator and is suitable for recording an indicator reaction. The diagnostic system may furthermore have a human-machine interface, in particular in the form of a screen, for example a display, for representing the at least one indicator recorded by means of the optical detector. The recorded indicator thus can be visually inspected indirectly by staff responsible for the operation of the fuel cell, for example a service employee. Afterwards, it is possible to assess the loading of the filter and whether the filter should be replaced. In principle, it would also be conceivable to evaluate the optical information, which has been recorded by the optical detector, automatically by way of a suitably embodied evaluation unit. When a critical loading of the indicator is reached, indicated by the indicator itself, it is possible for a corresponding signal to be generated, which prompts the responsible member of staff to replace the filter.

Alternatively, the indicator can be reviewed during scheduled servicing by the responsible member of staff.

According to a second aspect, as an alternative or in addition to the first aspect, the diagnostic arrangement comprises at least one ion-conducting ceramic. In particular, the ceramic is advantageously designed as an ion-conducting thin film ceramic, which possesses the property of having a resistance that differs as a function of the loading of the surface with particles. This changing of the resistance is attributable to the fact that particles that deposit on the surface of the ceramic prevent a conversion of oxygen molecules into oxygen ions, which causes the resistance to increase.

According to one development of the second aspect, the diagnostic arrangement comprises at least one resistance measurement arrangement, in particular arranged outside the supply air duct, for measuring a loading-dependent resistance of the ion-conducting ceramic.

By way of in particular continuously measuring the resistance and a known relationship between the resistance and a filter characteristic which reflects the loading of the filter, it is possible to infer the loading state of the filter. An evaluation of the measured resistance can take place by way of service employees according to what is stated above, said service employees comparing a resistance value output by means of a suitable human-machine interface with the known filter characteristic, as well as optionally ascertaining the actual loading of the filter by visually inspecting the filter. From this information, the service employees are able to determine the requirement for replacing the filter soon, or a point in time when they should aim to replace the filter. Alternatively, in turn, it is possible for an automatic evaluation to take place, for example by way of an in particular periodic comparison of the measured resistance with a predefined threshold value in a suitably embodied evaluation unit, wherein the evaluation unit in turn may be implemented as an integral component part of the resistance measurement arrangement or of a control facility that controls the functioning of the fuel cell. When the predefined threshold value is exceeded, it is possible for a corresponding item of information to be output via a human-machine interface, so that this can be recorded by service employees. Alternatively, it is likewise possible to transmit an item of information relating to the measured resistance periodically, or when the predefined threshold value is exceeded, to a central unit outside the vehicle on which the fuel cell is arranged, optionally together with further information relating to the functioning of the fuel cell. This central unit, or information output thereby via a human-machine interface, can then be used to initiate the replacement of the filter or at least a visual inspection of the filter by service employees.

The invention furthermore relates to a vehicle comprising at least one fuel cell and at least one diagnostic system according to the invention.

In particular, according to one development, the vehicle can be implemented as a rail vehicle.

Furthermore, the invention relates to a method for diagnosis of at least one filter of a fuel cell, which is characterized in that the filter and a diagnostic arrangement are arranged in a supply air duct, in which a supply air flow can be guided toward the fuel cell, wherein the diagnostic arrangement is arranged after the filter in the supply air duct in the flow direction of the supply air and wherein, in order to diagnose a loading of the filter with at least one predefined substance, a loading of the diagnostic arrangement with the at least one predefined substance is monitored.

According to one development of the method, the diagnostic arrangement comprises at least one indicator and/or at least one ion-conducting ceramic for indicating a respective loading with at least one predefined substance.

According to a further development of the method, when a predefined loading of the indicator is exceeded, in particular indicated by said indicator itself by way of an indicator reaction, such as a color change, for example, maintenance to be performed is indicated. Thus, a corresponding signal can be generated and output. The same applies when a predefined resistance value of the ion-conducting ceramic is exceeded. The filter is then cleaned during the maintenance, or is preferably replaced.

If the filter is arranged in a supply air duct of a fuel cell on board a vehicle, for example a rail vehicle, then the maintenance of the filter can take place, in a developed manner, as a function of a route to be traveled by the vehicle. Thus, it is optionally possible for the replacement of a filter to be shifted later in time when on a route that is known to be less polluted, whereas it is necessary to replace a filter on a vehicle which has to travel a route that is known to be polluted.

Both indicators and optical detectors for recording the indicator(s) are significantly less susceptible, in particular with regard to external interference, than gas sensors, which measure concentrations of predefined substances in their immediate surrounding area. Moreover, the concentrations of the substances in the supply line flow that are harmful to the fuel cell and are therefore to be filtered out are extremely small—they often involve particles lying in the "parts per billion" range (abbreviated to "ppb"). Gas sensors for measuring such small concentrations are, depending on the substance to be measured, currently not available, relatively inaccurate or comparatively susceptible to interference. Here, the diagnostic system according to the invention with easily replaceable indicators offers significant advantages regarding handling, costs, accuracy and reliability.

Status-oriented maintenance can significantly lower the maintenance costs, by maximizing use of the service life of the filters instead of replacing them across the board after a fixed interval regardless of the respective technical state. A status-dependent checking of the filters during operation is enabled by the diagnostic system according to the invention.

One advantage of the use of the diagnostic system according to the invention for determining the state of the filters consists in it being used until its wear margin has been almost fully reached. By eliminating the interval-dependent maintenance at regular defined intervals, a state-dependent maintenance creates the basis for being able to use the maximum service life of the filters. If it would be possible for filters that are being replaced every 3 months on a scheduled basis, for example, regardless of their technical state, to be only replaced on average every 6 months by converting to the state-dependent maintenance, then this would correspond to doubling their service life.

In this context, not only is there a saving of the costs for filters to be replaced over the life cycle, which usually corresponds to approx. 30 years in rail vehicles, but the stock of replacement filter parts that have to be kept available is also advantageously reduced.

The invention permits numerous embodiments. It is explained in further detail on the basis of the following FIGURE, in which the one exemplary embodiment is shown.

BRIEF DESCRIPTION OF THE FIGURES

In the FIGURE, the structure of a filter system with indicators is shown schematically. The fuel cell as well as the components shown are used on a rail vehicle.

DETAILED DESCRIPTION OF THE INVENTION

A supply air duct 1 of a fuel cell is shown. The supply line flow of fluid, here a gas or a gas mixture, for example ambient air, is illustrated by means of arrows in the flow direction of the gas or of the gas mixture. It is guided in the supply air duct 1. The fuel cell itself is not shown; it is arranged downstream. The suctioned air flows through the supply air duct 1 in the direction of a fuel cell stack.

A filter 2 connected upstream in the supply air duct 1 is used to filter undesirable harmful substances from the supply air and therefore to clean the fluid flow guided toward the fuel cell. A chemical filter component of the filter 2 to be monitored may comprise activated carbon. The filtered substances deposit on the surface thereof.

Downstream of the filter, i.e. connected after it, the arrangement comprises a system of indicators 3 as a diagnostic arrangement. Here, the system consists of multiple layers of indicators 3, which are specifically designed for the harmful gases that are relevant to the service life. The indicators 3 are held in a holder 5 such that they can be replaced. By way of the indicators 3, the chemical loading is determined.

For example, harmful gases that contain ammonia can be identified by acid-base-reactive indicators. To this end, a simple pH measurement of this layer during a regular maintenance interval would give information regarding the loading state of the filter.

Similar indicators are developed for harmful substances such as CO, $SO_2$ or $NO_x$, among others. To this end, the chemical reaction with these harmful substances can be used to generate a color change of the indicator 3. An assessment of the technical state takes place on the basis of this color change of the indicator 3. This is detected by a UV sensor, for example, and therefore reflects the information on the loading state of the filter for the service employee. Here, a camera 4 is arranged behind the indicators 3 in the supply line flow, oriented toward the indicators 3, and records any potential color change thereof.

Using this information, the service employee can arrange to replace the filter or, depending on the route traveled by the rail vehicle 8, for example routes known to have low amounts of harmful substances, to continue to use the filter and to only perform a replacement of the filter at a later point in time.

As an alternative or in addition to one or more indicators, it is possible for an ion-conducting ceramic 6 to be arranged in the supply air duct, after the filter in the flow direction of the supply air. In this context, the ceramic may be embodied as a thin film ceramic. By means of a resistance measurement, which is representative of the loading of the ceramic surface with particles, and is carried out by a resistance measurement arrangement 7, it is possible to infer the loading state of the filter by reconciliation with a filter characteristic.

The invention claimed is:

1. A diagnostic system for a filter of a fuel cell, the diagnostic system comprising:
    a supply air duct for guiding a supply air flow toward the fuel cell, the filter being disposed in said supply air duct; and
    a diagnostic arrangement disposed in said supply air duct after the filter in a flow direction of the supply air flow, said diagnostic arrangement configured to determine a loading of the filter with at least one predefined substance, said diagnostic arrangement including at least one indicator for indicating a loading of said at least one indicator with the at least one predefined substance; and
    at least one optical detector disposed in said supply air duct downstream of said diagnostic arrangement for optically recording an indicator reaction of said at least one indicator.

2. The diagnostic system according to claim 1, wherein said at least one indicator is adjusted to the filter for permitting said at least one indicator to reproduce a loading state of the filter.

3. The diagnostic system according to claim 1, wherein said at least one indicator is disposed immediately after the filter in the supply air flow toward the fuel cell.

4. The diagnostic system according to claim 1, wherein said at least one indicator of said diagnostic arrangement includes multiple indicators being different from one another for indicating a loading of said multiple indicators with multiple predefined substances being different from one another.

5. The diagnostic system according to claim 1, which further comprises a holder disposed in said supply air duct for holding said at least one indicator in a replaceable manner.

6. The diagnostic system according to claim 1, wherein said diagnostic arrangement includes at least one ion-conducting ceramic.

7. The diagnostic system according to claim 6, wherein said diagnostic arrangement includes at least one resistance measurement arrangement for measuring a loading-dependent resistance of said ion-conducting ceramic.

8. The diagnostic system according to claim 7, wherein said at least one resistance measurement arrangement is disposed outside of said supply air duct.

9. A vehicle, comprising:
at least one fuel cell and at least one diagnostic system according to claim 1.

10. The vehicle according to claim 9, wherein the vehicle is a rail vehicle.

11. A method for diagnosis of at least one filter of a fuel cell, the method comprising:
placing the filter and a diagnostic arrangement in a supply air duct for guiding a supply air flow toward the fuel cell;
placing at least one optical detector in the supply air duct downstream of the diagnostic arrangement;
locating the diagnostic arrangement in the supply air duct after the filter in a flow direction of the supply air flow; and
diagnosing a loading of the filter with at least one predefined substance by monitoring a loading of the diagnostic arrangement with the at least one predefined substance;
using at least one indicator of the diagnostic arrangement to indicate the loading of the at least one indicator with the at least one predefined substance; and
using the at least one optical detector to optically record an indicator reaction of the at least one indicator.

12. The method according to claim 11, which further comprises providing the diagnostic arrangement with at least one ion-conducting ceramic for indicating a respective loading with the at least one predefined substance.

13. The method according to claim 12, which further comprises replacing the filter when exceeding at least one of a predefined loading of the indicator or a predefined resistance value.

14. The method according to claim 11, which further comprises placing the filter in a supply air duct of a fuel cell on a vehicle, and replacing the filter as a function of a route to be traveled by the vehicle.

15. The method according to claim 14, which further comprises providing a rail vehicle as the vehicle.

\* \* \* \* \*